US 6,696,937 B1

(12) United States Patent
Kiefer

(10) Patent No.: US 6,696,937 B1
(45) Date of Patent: Feb. 24, 2004

(54) WIRELESS BRAKE CONDITION MONITOR

(76) Inventor: Karl F. Kiefer, 19221 IH-45, Suite 530, Conroe, TX (US) 77385

( * ) Notice: Subject to any disclaimer, the term of this patent is extended or adjusted under 35 U.S.C. 154(b) by 17 days.

(21) Appl. No.: 10/145,452

(22) Filed: May 14, 2002

Related U.S. Application Data

(60) Provisional application No. 60/290,608, filed on May 14, 2001.

(51) Int. Cl.$^7$ ................................................. B60Q 1/00
(52) U.S. Cl. ................. 340/453; 340/454; 188/1.11 W; 188/1.11 L
(58) Field of Search ................. 340/453, 454; 188/1.11 R, 1.11 W, 1.11 L; 73/121, 129

(56) References Cited

U.S. PATENT DOCUMENTS

| | | | | |
|---|---|---|---|---|
| 5,637,794 A | * | 6/1997 | Hanisko | 73/121 |
| 5,909,171 A | * | 6/1999 | Kyrtsos | 340/454 |
| 6,250,430 B1 | * | 6/2001 | Kyrtsos | 188/1.11 L |
| 6,260,665 B1 | * | 7/2001 | Kramer et al. | 188/1.11 L |
| 6,450,300 B1 | * | 9/2002 | Kramer | 188/1.11 L |

* cited by examiner

Primary Examiner—Toan N Pham
(74) Attorney, Agent, or Firm—Kenneth A. Roddy

(57) ABSTRACT

A solid-state brake condition monitoring system for a vehicle brake system having a rotor rotatable about an axis and a pad mounted on an extendable metal shoe that frictionally engages the pad with the rotor for creating braking force. The monitoring system includes at least one thermoelectric power converter cell secured on a heat absorbing surface of the brake system for producing electrical power in response to thermal energy, an electronic distance sensing transducer powered by the power converter cell for sensing the distance of the metal shoe relative thereto when extended and outputting an electrical signal corresponding to the sensed distance, the signal being indicative of pad wear, and a signal processing and RF transmitting module coupled with the distance sensing transducer and powered by the power converter cell for receiving the electronic signal from the distance sensing transducer and transmitting a RF signal corresponding to the signal indicative of pad wear to a remote RF receiver.

7 Claims, 2 Drawing Sheets

WIRELESS BRAKE CONDITION MONITOR

CROSS REFERENCE TO RELATED APPLICATION

This application claims priority of U.S. Provisional Application Ser. No. 60/290,608, filed May 14, 2001.

BACKGROUND OF THE INVENTION

1. Field of the Invention

This invention relates generally to brake pad wear sensing devices and methods, and more particularly to a wireless brake condition monitor that monitors the thickness of a disk brake pad and utilizes the thermal energy generated by the brakes to transmit that data to a remote receiver.

2. Brief Description of the Prior Art

Brake systems that are used in various types of vehicles such as automobiles and aircraft typically employ high friction brake pads that are connected to a stationary suspension or frame component so as to prevent rotation of the pads. When a braking force is desired, each pad is moved into engagement with a smooth rotor that is typically in the form of a disk. In a disk brake system, a caliper assembly squeezes the rotor between a pair of pads. The pads are typically made of a composite material and the rotor is typically made of metal. The friction between the non-rotating pads and the rotor provides the braking force. The friction surface of each pad is gradually worn away until the pad is consumed and must be replaced. Replacement of brake pads is a periodic necessity. However, a determination as to when pads are in need of replacement is an inexact science.

Failure to replace brake pads in a timely manner may result in damage to the rotor or other components within the brake system, or injury to the vehicle occupants or others due to brake failure.

There are several patents that disclose various brake wear sensing devices, none of which are powered by heat generated by the friction of the brake pads to wirelessly transmit data to a remote receiver.

White et al, U.S. Pat. No. 5,559,286 discloses a vehicle friction material condition measurement system wherein a sensor which responds to both changes in working length and temperature is embedded in a friction lining to provide a signal indicative of both wear and temperature to an electronic control unit which interprets long term averaged change in the sensor resistance measured when the vehicle is stationary as lining wear and short term changes in sensor resistance as representative of lining temperature.

Kyrtsos, U.S. Pat. No. 5,939,978 discloses a temperature sensing brake lining wear indicator which utilizes a temperature sensor assembly embedded in a brake lining of a drum brake assembly. The temperature sensor assembly includes two temperature sensors with a first temperature sensor located at a first distance X from the wear surface of the brake lining and a second temperature sensor located at a second distance X+d from the wear surface. A timing device measures the time period for the first temperature sensor to reach a first predetermined temperature and measures the time period for the second temperature sensor to reach a second predetermined temperature. The remaining useful thickness of the brake lining is determined based on the ratio of the respective time periods.

Strzelczyk et al, U.S. Pat. No. 6,257,374 discloses a brake pad wear sensing system and method wherein a magnet provides a magnetic field and a Hall effect sensor senses the magnetic field and outputs an electrical signal indicative of the sensed magnetic field that is indicative of pad wear.

Thermoelectric cells that convert thermal energy to electrical power are also known in the art. Typically the thermoelectric cell comprises an electrolyte disposed between two metal electrodes. A temperature differential or gradient is imposed between the electrodes to produce a voltage across the electrodes. An electrical circuit is connected to the electrodes to allow for removal of electrical energy from the cell. Generally, the voltage of the cell is proportional to the temperature difference when the cell is connected across a constant electrical load, so that, even the slightest temperature differential will produce a current. Applicant is not aware of any thermoelectric cells that are used in a braking system to operate sensing devices and transmit data to a remote receiver.

The present invention is distinguished over the prior art in general, and these patents in particular, by a solid-state brake condition monitoring system for a vehicle brake system of the type having a rotor rotatable about an axis and a pad mounted on an extendable metal shoe that frictionally engages the pad with the rotor for creating braking force. The monitoring system includes at least one thermoelectric power converter cell secured on a heat absorbing surface of the brake system for producing electrical power in response to thermal energy, an electronic distance sensing transducer powered by the power converter cell for sensing the distance of the metal shoe relative thereto when extended and outputting an electrical signal corresponding to the sensed distance, the signal being indicative of pad wear, and a signal processing and RF transmitting module coupled with the distance sensing transducer and powered by the power converter cell for receiving the electronic signal from the distance sensing transducer and transmitting a RF signal corresponding to the signal indicative of pad wear to a remote RF receiver.

SUMMARY OF THE INVENTION

It is therefore an object of the present invention to provide a wireless brake condition monitor system and method that monitors the thickness of a disk brake pad and utilizes the thermal energy generated by the brakes to transmit that data to a remote receiver It is another object of this invention to provide a solid-state wireless brake condition monitor that has no moving parts and will last indefinitely with no service required.

Another object of this invention is to provide a wireless brake condition monitor in a miniature package that can be easily secured to a conventional brake caliper.

Another object of this invention is to provide a wireless brake condition monitor that is powered from the heating of the brakes and does not require batteries or connections other sources of power.

A further object of this invention is to provide a wireless brake condition monitor that will provide data representing the condition of the brake pads each time the brakes are applied.

A still further object of this invention is to provide a wireless brake condition monitor that is simple in construction, inexpensive to manufacture, and rugged and reliable in operation.

Other objects of the invention will become apparent from time to time throughout the specification and claims as hereinafter related.

The above noted objects and other objects of the invention are accomplished by a solid-state brake condition monitoring system for a vehicle brake system of the type having a rotor rotatable about an axis and a pad mounted on an extendable metal shoe that frictionally engages the pad with the rotor for creating braking force. The monitoring system includes at least one thermoelectric power converter cell secured on a heat absorbing surface of the brake system for producing electrical power in response to thermal energy, an electronic distance sensing transducer powered by the power converter cell for sensing the distance of the metal shoe relative thereto when extended and outputting an electrical signal corresponding to the sensed distance, the signal being indicative of pad wear, and a signal processing and RF transmitting module coupled with the distance sensing transducer and powered by the power converter cell for receiving the electronic signal from the distance sensing transducer and transmitting a RF signal corresponding to the signal indicative of pad wear to a remote RF receiver.

DESCRIPTION OF THE PREFERRED EMBODIMENT

A conventional vehicle brake system includes a plurality of brake units associated with one of a plurality of wheels. It should be understood that in the following discussion and accompanying figures, the brake unit is shown and described a single brake unit and an associated wheel for simplicity, but that the components of the present monitoring system is applicable to each of the other brake units and associated wheels. It should also be understood that some of the components of the brake caliper arrangement are conventional and well known in the art, and are described but not shown in detail.

Figure 1:
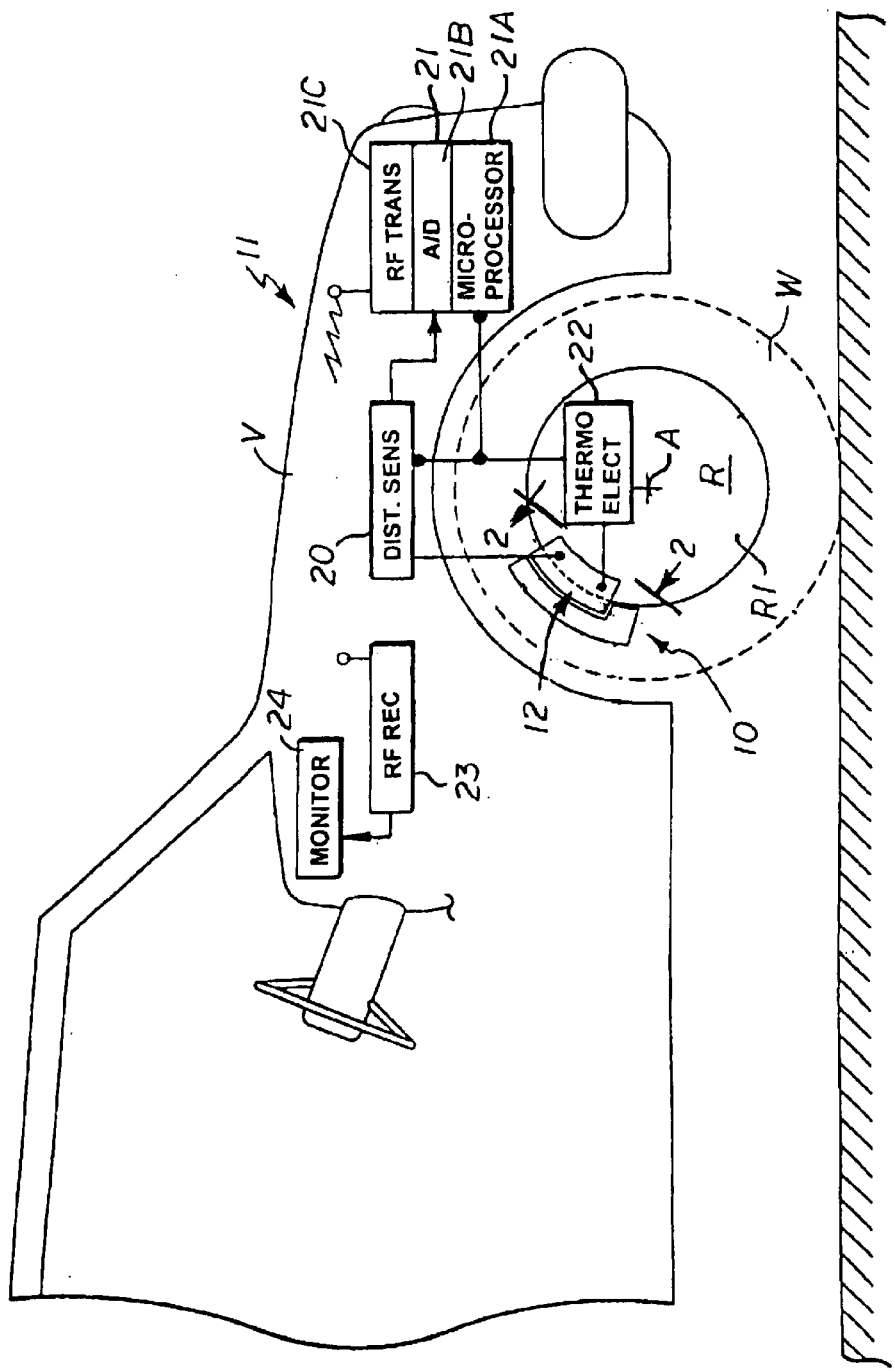
FIG. 1 is a schematic illustration of the wireless brake condition monitoring system in accordance with the present invention installed on the brake system of a vehicle.
Figure 2:
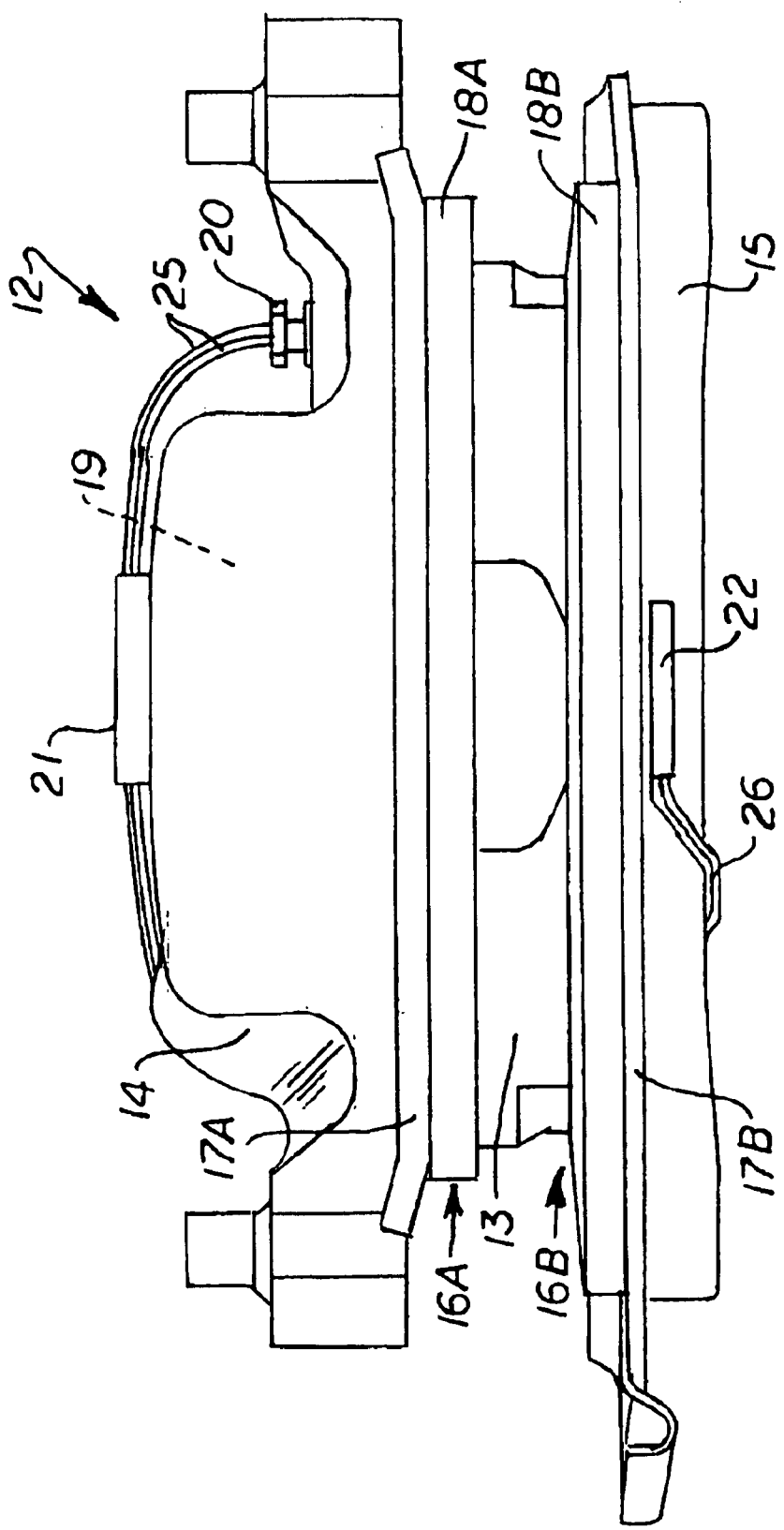
FIG. 2 is a bottom elevation view of a disk brake caliper equipped with the wireless brake condition monitoring apparatus.

Referring now to the drawings by numerals of reference, there is shown somewhat schematically in FIGS. 1 and 2, a typical disk brake unit 10 provided with a wireless brake condition monitoring system 11 in accordance with the present invention. The wheel W of the vehicle V is rotatable about an axis "A". The typical disk brake unit 10 includes a circular metal rotor R that is fixed for rotation with the vehicle wheel about its axis "A" and has two planar side surfaces R1 and R2 (only side R1 is visible in FIG. 1). The brake unit 10 has a generally saddle-shaped caliper 12 that is mounted on a suspension component of the vehicle V so as to hold it stationary relative to the rotation of the rotor R.

As best seen in FIG. 2, the caliper 12 has a bridge portion 13 that extends over the rotor and has opposed facing inner and outer leg portions 14 and 15 disposed to face each side surface of the rotor (rotor not shown in FIG. 2 to avoid confusion). The inner and outer leg portions 14 and 15 have a movable shoe/pad assembly 16A and 16B, each located adjacent to a respective side of the rotor. Typically, the inner shoe/pad assembly 16A moves relative to the inner leg portion 14 of the caliper, and the outer shoe/pad assembly 16B moves with the outer leg portion 15. Each shoe/pad assembly includes a metal shoe 17A, 17B and a brake pad 18A, 18B that faces a respective side of the rotor. The pads 18A, 18B are made of composite material that has a relatively high coefficient of friction.

As is well known in the art, when the brake is activated, the inner brake pad 18A is extended relative to the inner leg portion 14 and pressed against the rotor by a hydraulic piston 19 in the inner leg portion 14 of the caliper 12. In addition, the outer leg portion 15 of the caliper slides toward the inner side relative to the stationary inner leg portion 14 by receiving counterforce from the piston, causing the outer leg portion to press the outer brake pad 18B against the rotor. Thus, the rotor is given braking force from both sides by the friction pads.

The frictional engagement between the pads 18A and 18B and the rotor cause the pads and the rotor to wear. As each pad 18A, 18B wears, the pad becomes thinner, and eventually, the pads must be replaced to prevent damage to the rotor or other components of the brake unit.

The major components of the brake condition monitoring system 11 of the present invention include a distance or proximity measurement transducer 20, a radio module 21, and a solid state thermal power converter 22. The vehicle V is provided with an RF signal receiver 23 located under the hood or other suitable location which is connected with the vehicle monitoring system 24. The vehicle monitoring system 24 receives signals from the RF receiver and produces a warning signal and/or visually displays data representing the condition or amount of wear of the brakes.

The distance or proximity measurement transducer 20 senses the proximity of the metal inner shoe 17A relative thereto when extended and produces analog signals corresponding to the distance. The radio module 21 includes a programmable microprocessor 21A with an analog to digital A/D signal processing circuit 21B and a radio frequency (RF) transmitter 21C. The thermal power converter 22 is a solid state device, such as a thermoelectric power cell that produces DC voltage in response to thermal energy.

The distance or proximity measurement transducer 20 and the radio module 21 are secured on the stationary inner leg portion 14 of the caliper 12 and are electrically coupled by a pair of insulated electrical leads 25. The thermal power converter 22 is secured to the outer side of the metal outer shoe 17B of the outer brake pad 18B and is electrically coupled to the radio module 21 by a pair of insulated electrical leads 26. The thermal power converter 22 supplies DC electrical energy to the distance or proximity measurement transducer 20 and the radio module microprocessor 21A to carry out the signal processing and RF signal transmitting functions.

OPERATION

As the vehicle brakes are applied, heat begins to build up on the caliper 12. The thermal energy is transformed to DC electrical current by the thermal power converter 22. When the current is sufficient to produce a voltage appropriate to operate the radio module 21, the microprocessor 21A of the radio module powers up the distance or proximity measurement transducer 20 and the signal processing circuit 21B of the radio module. The distance or proximity measurement transducer 20 senses the distance to the backside of the movable metal brake shoe 17A when it is extended toward the rotor by the hydraulic force of brake application, and transmits an analog signal corresponding to the measurement value to the A/D signal processor 21B of the radio module. This distance continues to expand as the brake pad 18B wears. When the distance reaches a pre-determined threshold, the radio module 21 encodes the analog signal and obtains a digital value, and modulates the radio frequency output 21C to transmit a RF warning signal along with the actual digital value of the measurement to the RF receiver 23 in the vehicle. As the brake caliper 12 cools between applications, the electrical energy supply to the radio module 21 decreases and the radio module ceases operation. Upon the next application of the brakes, the process is repeated. Thus, during vehicle operation, a flow of data representing the condition or amount of wear of the brakes is available to the vehicle monitoring system 24.

Preferably, the microprocessor 21A of each radio module 21 for each of the brake units on the respective wheels is programmed with a corresponding unique identifying code that is also transmitted to the RF receiver 23 in the vehicle and displayed by the monitoring system 24 so that the condition of the brake unit on each respective wheel can be monitored. Also preferably, the microprocessors of the radio modules for each vehicle are programmed with a code that prevents RF interference and cross talk with other vehicles equipped with the brake monitoring system.

Although for purposes of example and ease of understanding, the components of the present wireless brake condition monitoring system have been shown installed on a disk brake caliper and described as individual components connected by leads, it should be understood that the distance or proximity measurement transducer 20, the radio module 21, and the solid state thermal power converter 22 may be provided as a single solid-state microchip unit, and may also be installed on drum brake systems.

The power produced by small thermoelectric power cells is a function of the area of the cell, and in some applications it is difficult to maintain a thermal gradient across the cells since they tend to quickly assume the temperature of the heat source. However, the present thermal power converter 22 does not require long term power and is quickly subjected to a high delta T which produces a power level sufficient to sustain the measurement electronics and transmit the data signals in high speed "bursts". The high speed signal transmission bursts also minimizes RF interference.

While this invention has been described fully and completely with special emphasis upon preferred embodiments, it should be understood that within the scope of the appended claims the invention may be practiced otherwise than as specifically described herein.

What is claimed is:

1. A solid-state brake condition monitoring system for a vehicle brake system having a rotatable member connected with a wheel rotatable about an axis and a pad mounted on an extendable metal shoe that frictionally engages the pad with the rotatable member for creating braking force, the monitoring system comprising:

thermoelectric power converter means secured on a heat absorbing surface of the brake system for producing electrical power in response to thermal energy;

electronic distance sensing transducer means powered by said power converter means for sensing the distance of the metal shoe relative thereto when extended and outputting an electrical signal corresponding to the sensed distance, said signal indicative of pad wear; and signal processing and RF transmitting means coupled with said distance sensing transducer means and powered by said power converter means for receiving said electronic signal from said distance sensing transducer means and transmitting a RF signal corresponding to said signal indicative of pad wear to a remote RF receiver.

2. The solid-state brake condition monitoring system according to claim 1, wherein said electronic distance sensing transducer means outputs an analog signal corresponding to the measurement value of the sensed distance indicative of pad wear; and said signal processing and RF transmitting means converts the analog signal to a digital signal corresponding to the measurement value of the sensed distance and transmits a RF signal corresponding thereto.

3. The solid-state brake condition monitoring system according to claim 1, further comprising:

a RF receiver on the vehicle disposed remote from said signal processing and RF transmitting means for receiving said RF signal; and a monitoring system on said vehicle connected with said RF receiver for receiving a RF signal from the RF receiver and indicating the condition of the brakes in response to the received signal.

4. The solid-state brake condition monitoring system according to claim 3, wherein said monitoring system visually displays the condition of the brakes in response to the received signal.

5. The solid-state brake condition monitoring system according to claim 3, wherein said monitoring system visually displays data representing the amount of wear of the brake pad in response to the received signal.

6. A solid-state brake condition monitoring device for a vehicle brake unit having a brake pad mounted on an extendable metal shoe that frictionally engages the pad with a rotatable member to create braking force, comprising:

at least one thermoelectric power converter cell adapted to be secured on a heat absorbing surface of the vehicle brake unit for producing electrical power in response to thermal energy;

an electronic distance sensing transducer coupled with said power converter cell and powered thereby for sensing the distance of the metal shoe relative thereto when extended and outputting an electrical signal corresponding to the sensed distance, said signal indicative of pad wear; and signal processing and RF transmitting means coupled with said distance sensing transducer means and powered by said power converter means for receiving said electronic signal from said distance sensing transducer means and transmitting a RF signal corresponding to said signal indicative of pad wear to a remote RF receiver.

7. A method for monitoring the condition of a vehicle brake system having a rotatable member connected with a wheel rotatable about an axis and a pad mounted on an extendable metal shoe that frictionally engages the pad with the rotatable member for creating braking force, comprising the steps of:

converting thermal energy produced by frictional engagement of the brake pad with the rotatable member to electrical power;

utilizing the electrical power to operate an electronic distance sensing transducer to sense the distance of the metal shoe relative to the transducer when extended and output an electrical signal corresponding to the sensed distance, said signal indicative of pad wear; and utilizing the electrical power to operate an electronic signal processing and RF transmitting means to receive said electronic signal and transmit a RF signal corresponding to said signal indicative of pad wear to a remote RF receiver.

* * * * *